United States Patent

Wright

[15] 3,636,582
[45] Jan. 25, 1972

[54] WINDSHIELD WIPER BLADE

[72] Inventor: Walton Reid Wright, Raleigh, N.C.
[73] Assignee: Unitek, Ltd., Raleigh, N.C.
[22] Filed: July 10, 1970
[21] Appl. No.: 53,731

[52] U.S. Cl. .................................................15/250.03
[51] Int. Cl. .............................................B60s 1/02
[58] Field of Search .............15/250.03, 250.04, 250.01, 15/250.02

[56] References Cited

UNITED STATES PATENTS

| 1,845,782 | 2/1932 | Brazee | 15/250.03 |
| 1,870,369 | 8/1932 | Lunsford | 15/250.03 |
| 2,203,071 | 6/1940 | Zaiger | 15/250.03 |

Primary Examiner—Peter Feldman
Attorney—Pierce, Scheffler & Parker

[57] ABSTRACT

A windshield wiper blade provided with a longitudinal porous sack extending parallel to and closely adjacent the wiper blade, said sack containing a soluble cleansing agent so that when the windshield is wetted the detergent is dissolved and released from the sack through the assistance of the flexing action of the wiper blade and the solution applied to the windshield to dissolve and/or remove road film, grime, mud and the like.

11 Claims, 9 Drawing Figures

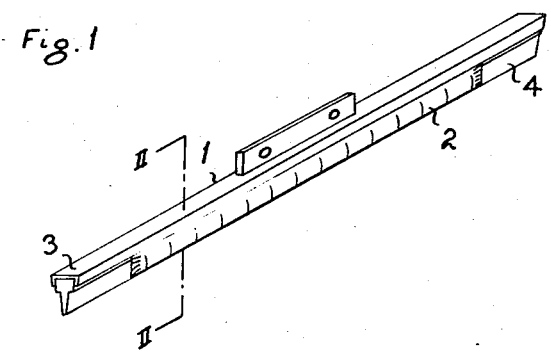
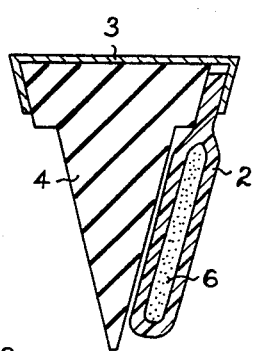
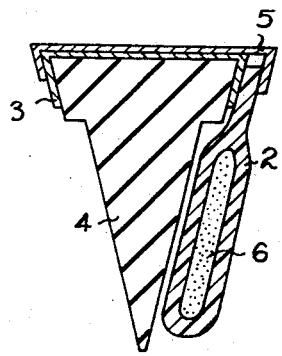
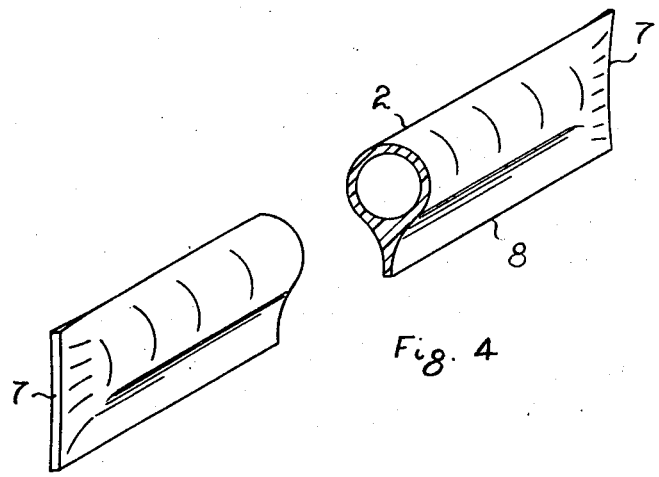

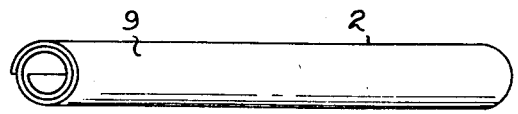
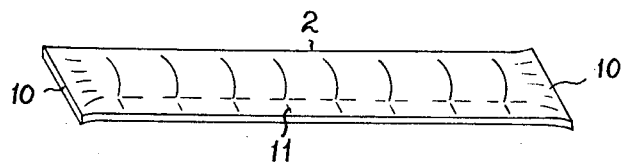
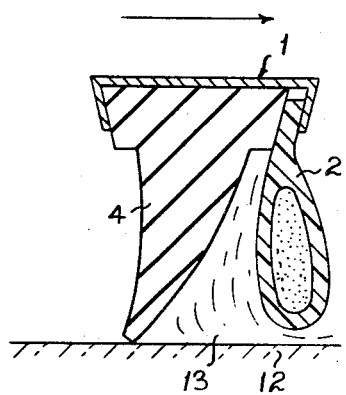
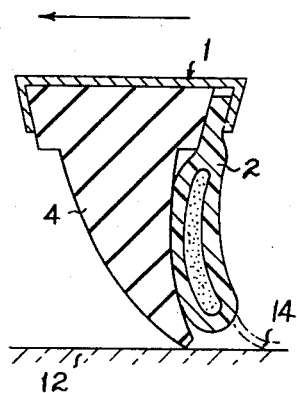
Fig. 5
Fig. 5a
Fig. 6
Fig. 7
INVENTOR.
WALTON REID WRIGHT
BY
Pierce, Scheffler & Parker

WINDSHIELD WIPER BLADE

The present invention relates to an improved windshield wiper with an attachment therefor which, when the windshield is wetted and the wiper reciprocated, will dispense amounts of dissolved cleaning agent onto the windshield so as to dissolve and/or loosen dirt, grime, road film, grease or the like so that it can be easily removed therefrom.

The attachment as described hereinafter is a sack alongside the wiper blade and may be secured to a conventional windshield wiper in different ways depending on whether it is secured to the wiper during the manufacture of the wiper or applied by the motorist to a wiper already installed on a vehicle.

The sack which is generally microporous is attached to the wiper assembly and may have very slight porous walls or walls which are more porous depending on the nature of the cleansing agent used. If an agent is used which is only slightly soluble in water a more porous sack may be employed whereas if a rather rapidly or easily soluble agent is used the sack should be less porous.

In normal use the porosity of the sack and nature of the cleansing agent are correlated so that under normal driving conditions and with normal amounts of rainfall the cleansing agent will not be depleted or spent for several months, i.e., of the order of 3 or 4 months or longer.

After depletion the attachment may be easily and readily replaced by a fresh sack with a new supply of cleansing vice agent which, as will be seen below, may be readily attached to the wiper assembly.

One particular advantage of the present invention is the fact that the normal reciprocal motion of the wiper when being operated will assist in the proper release of the cleansing agent by causing water to flow about the sack when the wiper moves in one direction so as to assist penetration of water into the porous sack to dissolve small amounts of the cleansing agent and when the wiper moves in the opposite direction the wiper blade will tend to cause a squeezing action on the porous sack to evenly distribute the dissolved cleaning agent directly onto the windshield.

FIG. 1 is a perspective view of a conventional windshield wiper with cleaning agent directly onto the windshield.

Other objects of the present invention will be apparent from the following description in relation to the accompanying drawings.

In the drawings:

FIG. 1 is a perspective view of a conventional windshield wiper with a porous sack attached thereto, FIG. 2 is a cross-sectional view on line II—II of FIG. 1 showing one method of attaching the porous sack to the wiper assembly, FIG. 3 is a cross-sectional view similar to FIG. 2 showing another method of attaching a sack to the wiper assembly by means of removable clips.

FIG. 3a is a perspective view of a spring clip for attaching the sack to the wiper assembly as shown in FIG. 3, FIG. 4 is a perspective view of one form of sack, before mounting, broken away in the center to show the cavity therein, FIGS. 5 and 5a are perspective views of an alternate type of sack showing the initial formation and the finished sack ready for mounting.

FIGS. 6 and 7 are cross-sectional views of the assembled wiper and sack showing the effect of reciprocal movement of the wiper on the sack.

Referring to FIG. 1, a conventional wiper assembly 1 is shown with a sack 2 secured lengthwise thereof by the channel clamp 3 which grips the flange. The clamp 3 is conventionally used for retaining the flexible wiper blade 4 in place. Although the blade 4 is shown as having a substantially triangular cross section, it will be understood that other configurations are possible provided only that the blade will flex when in operation.

FIG. 2 is a cross section of FIG. 1 on lines II—II thereof and shows in greater detail how the sack 2 is secured by the clamp 3 to lie alongside the tapering wiper blade 4. In this view as well as in FIG. 3 it will be seen that the sack 2 does not extend entirely to the edge of the wiper blade for reasons explained below.

FIGS. 3 and 3a show an arrangement whereby the sack 2 is clipped onto the outside of the wiper assembly by several flexible clips 5 which may be easily placed about clamp 3 to secure the sack 2 in place as shown. This later arrangement enables one to easily and quickly replace a spent or depleted sack by removing the clips 5 to remove the used sack and to be replaced so as to clip a fresh sack in place as shown in FIG. 3.

FIG. 4 shows a sack 2 which may be formed of a plastic material such as PVC or the like which has been made porous by methods known in that art and may be preformed by an extrusion process or the like. Usually, the sack is formed as a hollow element with a longitudinal flange 8 extending outwardly therefrom and is then cut into suitable lengths. After filling a unit with a suitable cleansing agent 6 the nature of which is described further below, the ends 7 are heat sealed to form the closed sack 2. Although shown as having a cavity which is circular it will be understood that it is readily and easily flattened partly by the clamp 3 or clip 5 to assume the shape seen in FIGS. 2 and 3, or the extruded element may have the flattened form.

FIGS. 5 and 5a show in perspective a sack 2 made by rolling a sheet of the microporous material into a roll 9 as seen in FIG. 5 and after filling with a suitable cleansing agent the ends 10 are closed by heat sealing or in other ways, as by suitable wetproof adhesives and a flange 11 is formed longitudinally along one side of the sack for clamping purposes and is similar to the flange 8 of FIG. 4. When the sack is made of porous thermoplastic material it is usually advantageous to form the flange 11 by a heat sealing operation when the ends 10 are sealed or before filling with cleansing agent.

FIGS. 6 and 7 show how the reciprocal action of the wiper 1 causes the sack 2 to function with great efficiency. In FIG. 6, the wiper is moving to the right whereby the wiper blade 4 bends to the left as it sweeps across the glass surface of the windshield 12 thus forcing water into the space 13 created between the blade 4 and sack 2 so that the sack is thoroughly wetted and the water seeps into the sack due to its porosity and dissolves a small amount of the cleansing agent. Upon the return stroke of the wiper 1, as shown in in FIG. 7, the blade 4 is bent to the right and presses against the sack 2 so as to cause a squeezing action thereon and causes the dissolved cleansing agent to be removed from the sack and flow down onto the windshield 12 in a substantially even film 14 shown in magnified form for clarification. Since the cleansing agent is in solution and is preferably water white it does not impede vision to any great extend while on the windshield. The solution thus deposited acts upon the road film, grime, dirt and the like until rinsed away by rain or until the wiper blade sweeps back again as in FIG. 6 and removes the solution as well as additional rain water from the windshield 12 while at the same time forcing some of the water and remaining solution if any up into the space 13 as explained above. Since most cleansing agents are so called "wetting agents" the solution thereof while on the windshield will prevent drop formation and form a uniform wetting of the windshield which prevents distortion of vision through the windshield.

As mentioned above the sack 2, when the wiper is at rest does not extend down to nor touch the windshield, since when the wiper is in use the bending of the blade 4 brings the sack 2 closer to the windshield. Usually the sack 2 does not even then, touch the windshield (see FIGS. 6 and 7) but when an abrasive-resistant porous material is used for the sack 2 it does not impede the effectiveness of the wiping and cleaning action even if there is light contact of the sack with the windshield at various points.

It has been found that the sacks may be made of various microporous polymers such as polyvinyl chloride and others and when it is desirable to strengthen such polymeric sacks they may be formed, as for example, in FIGS. 5 and 5a, by providing a base of woven material such as dynel nylon or nylon and depositing the polymer thereon so that the base is embedded in the polymer. In this case, if and when the outer surface of the sack is worn away the more abrasive-resistant base material becomes partly exposed and thus protects the inner layer of porous polymers from further wear.

There are various known methods for controlling the porosity of different polymeric materials and thus a particular porosity may be chosen to correlate with the particular cleansing agent used so as to control the dispensing thereof in the desired amounts.

Various detergents or cleansing agents may be used although it is most desirable that they be of the nonfoaming variety, such as the type now employed for so-called "dishwasher detergents" i.e., tribasic sodium phosphate and the like.

It has been found that substantially any and all cleansing agents, whether anionic, cationic or nonionic may be used provided it is in the form of a granulated solid or a gel of a viscous or semiviscous liquid.

Generally the cleansing agent can be of the anionic type such as various known alkyl sulfates, alkylaryl sulfonates or the lignin sulfonate derivatives. Soap is usually undesirable since it may leave a residual film. The above agents are also low in cost.

The cationic agents such as the various quaternary ammonium salts may be used by the present cost thereof is excessive from an economic point of view.

The nonionic types of agents such as fatty acid esters can be used but their relatively mild detergent action may be insufficient for accomplishing the desired results in cleaning windshields.

What I claim is:

1. A windshield wiper assembly comprising a longitudinal wiper blade of flexible material, one edge of which engages the windshield, means for supporting said wiper blade, means for moving said supporting means reciprocally so that said wiper blade moves reciprocally over the surface of the windshield, thus flexing said blade, a longitudinal porous sack containing a water-soluble cleansing agent secured to said supporting means and substantially parallel with and on one side of said wiper blade and closely adjacent thereto, the effective height of said sack being shorter than the height of said blade and normally spaced from the windshield, whereby when the windshield is wetted with water and said wiper blade will flex as it is moved reciprocally over the windshield, so that said wiper blade will, when moved in one direction force water up along the side of said sack which faces said wiper blade so that the water may penetrate the porous sack to dissolve some of the cleansing agent and when moved in the opposite direction will squeeze the sack to dispense dissolved cleansing agent therefrom, the solution of cleansing agent flowing uniformly onto the windshield to cleanse the same, and to be removed on the next sweep of the wiper blade.

2. A wiper assembly as claimed in claim 1 wherein said sack is provided with a longitudinal outwardly extending flange secured longitudinally to the wiper assembly.

3. A wiper assembly as claimed in claim 2 and further comprising removable flexible clip members for securing said sack to the wiper assembly.

4. A wiper assembly as claimed in claim 1 wherein said sack is composed of a microporous thermoplastic material.

5. A wiper assembly as claimed in claim 4 wherein the microporous thermoplastic material is polyvinyl chloride.

6. A wiper assembly as claimed in claim 4 wherein said sack comprises a hollow element closed at its ends and provided with a longitudinal outwardly extending flange secured to the wiper assembly.

7. A wiper assembly as claimed in claim 2 wherein said sack comprises a sheet of microporous thermoplastic material rolled up to form a hollow element and closed at its ends.

8. A wiper assembly as claimed in claim 7 wherein the sheet of microporous thermoplastic material is provided with an embedded sheet of woven abrasion-resistant material.

9. A wiper assembly as claimed in claim 8 wherein the embedded sheet is selected from the group consisting of dynel and nylon.

10. A wiper assembly as claimed in claim 1 wherein the porosity of the sack is correlated to the solubility of the cleansing agent whereby said sack has high porosity when the cleansing agent has low solubility and vice versa.

11. A wiper assembly as claimed in claim 10 wherein the cleansing agent is an anionic detergent.

* * * * *